US012569914B2

(12) United States Patent
Tawil et al.

(10) Patent No.: US 12,569,914 B2
(45) Date of Patent: Mar. 10, 2026

(54) SYSTEM AND METHOD FOR CONTROLLING FLOW THROUGH A 3D PRINTER

(71) Applicant: Additive Technologies, LLC, Palm City, FL (US)

(72) Inventors: Kareem Tawil, Pittsford, NY (US); Christopher T. Chungbin, Webster, NY (US)

(73) Assignee: ADDITIVE TECHNOLOGIES, LLC, Palm City, FL (US)

( * ) Notice: Subject to any disclaimer, the term of this patent is extended or adjusted under 35 U.S.C. 154(b) by 662 days.

(21) Appl. No.: 17/930,233

(22) Filed: Sep. 7, 2022

(65) Prior Publication Data

US 2024/0075530 A1 Mar. 7, 2024

(51) Int. Cl.
| | |
|---|---|
| *B22F 12/53* | (2021.01) |
| *B22F 10/85* | (2021.01) |
| *B22F 12/90* | (2021.01) |
| *B33Y 30/00* | (2015.01) |
| *B33Y 50/02* | (2015.01) |

(52) U.S. Cl.
CPC .............. *B22F 12/53* (2021.01); *B22F 10/85* (2021.01); *B22F 12/90* (2021.01); *B33Y 30/00* (2014.12); *B33Y 50/02* (2014.12); *B22F 2301/052* (2013.01)

(58) Field of Classification Search
CPC ......... B33Y 30/00; B33Y 10/00; B22F 10/22; B22F 12/53; B22F 15/53; B22F 2999/00; F16K 99/0044
USPC .................................... 222/590–594; 164/4.1
See application file for complete search history.

(56) References Cited

U.S. PATENT DOCUMENTS

| | | | | |
|---|---|---|---|---|
| 3,014,255 | A | * | 12/1961 | Muller ...................... C21C 7/10 75/10.14 |
| 5,560,543 | A | * | 10/1996 | Smith ..................... B22F 1/065 310/331 |
| 7,942,987 | B2 | | 5/2011 | Crump et al. |
| 8,240,336 | B2 | | 8/2012 | Welle |
| 9,027,378 | B2 | | 5/2015 | Crump et al. |
| 9,393,581 | B2 | * | 7/2016 | Rasa ..................... B05B 12/004 |
| 10,189,081 | B2 | * | 1/2019 | Pascall ................... B33Y 50/02 |
| 11,104,058 | B2 | * | 8/2021 | Zinniel .................. B33Y 10/00 |
| 2008/0011448 | A1 | | 1/2008 | Manda |

(Continued)

FOREIGN PATENT DOCUMENTS

WO 2017/152142 A1 9/2017

OTHER PUBLICATIONS

Tawil et al., "System and Method for Controlling Flow Through a 3D Printer," U.S. Appl. No. 17/930,226, filed Sep. 7, 2022.

*Primary Examiner* — Charles P. Cheyney
(74) *Attorney, Agent, or Firm* — MH2 Technology Law Group LLP

(57) ABSTRACT

A valve configured to control flow of a material therethrough includes a body having a bore formed axially therethrough. The valve also includes a cooler positioned at least partially around or within the body. The cooler is configured to cool the material to below a melting point of the material to form a solid plug within the body to prevent the material from flowing therethrough. The valve also includes a heater positioned at least partially around or within the body. The heater is configured to re-heat the material to above the melting point of the material to allow the material to flow therethrough.

14 Claims, 10 Drawing Sheets

(56) References Cited

U.S. PATENT DOCUMENTS

| | | | | |
|---|---|---|---|---|
| 2010/0200093 | A1 | 8/2010 | Welle | |
| 2017/0087632 | A1* | 3/2017 | Mark | B22D 27/003 |
| 2022/0023938 | A1* | 1/2022 | Friedrich | B22F 12/70 |
| 2022/0143686 | A1* | 5/2022 | Knotts | B22F 12/17 |
| 2022/0410268 | A1* | 12/2022 | Perrone | B22F 10/30 |
| 2023/0008592 | A1* | 1/2023 | Sheflin | B33Y 50/02 |
| 2023/0063103 | A1* | 3/2023 | McConville | B22F 10/40 |
| 2023/0150033 | A1* | 5/2023 | Herrmann | B22F 12/53 |
| | | | | 164/4.1 |

* cited by examiner

SYSTEM AND METHOD FOR CONTROLLING FLOW THROUGH A 3D PRINTER

TECHNICAL FIELD

The present teachings relate generally to three-dimensional (3D) printing and, more particularly, to systems and methods for controlling a flow of a build material through a nozzle of a 3D printer.

BACKGROUND

Some 3D printing applications use a metallic build material instead of a conventional aqueous ink. The initially-solid build material is heated to a high temperature to convert it into a liquid (e.g., molten) state so that it may flow through the nozzle. A valve may be used to control the flow of the liquid build material through the nozzle. However, due to the high temperature, plastic valves and/or refractory metal valves cannot be used. Instead, refractory ceramic valves are currently used. Conventional refractory ceramic valves are not robust or reliable. Therefore, what is needed is an improved system and method for controlling a flow of a metallic material (e.g., a metallic build material through a nozzle of a 3D printer).

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A 3D printer is disclosed. The 3D printer includes an ejector configured to receive a build material. The 3D printer also includes a valve configured to control flow of the build material into or through the ejector. The valve includes a cooler configured to cool the build material to below a melting point of the build material to form a solid plug to prevent the build material from flowing therethrough. The valve also includes a heater configured to re-heat the build material to above the melting point to allow the build material to flow therethrough. The 3D printer also includes a nozzle positioned downstream from the valve. The build material is ejected through the nozzle. The 3D printer also includes a substrate positioned below the nozzle. The build material lands on the substrate and cools and solidifies thereon to form a 3D object.

In another embodiment, the 3D printer includes an ejector configured to receive a build material. The build material is metal. The 3D printer also includes a valve configured to control flow of the build material into or through the ejector. The valve includes a body having an inlet, an outlet, and a narrow portion between the inlet and the outlet. A diameter of the narrow portion is smaller than a diameter of the inlet, the outlet, or both. The valve also includes a cooler positioned at least partially around the narrow portion. The cooler is configured to cool the build material to below a melting point of the build material to form a solid plug within the body to prevent the build material from flowing therethrough. The valve also includes a heater positioned at least partially between the body and the cooler. The heater is configured to re-heat the build material to above the melting point to allow the build material to flow therethrough. The 3D printer also includes a nozzle positioned downstream from the valve. The build material is ejected through the nozzle. The 3D printer also includes a substrate positioned below the nozzle. The build material lands on the substrate and cools and solidifies thereon to form a 3D object.

A method for controlling a flow of a build material through a 3D printer is also disclosed. The method includes actuating a valve into a closed position to prevent the build material from flowing into or through an ejector of the 3D printer. The valve includes a cooler positioned at least partially around the build material. Actuating the valve into the closed position comprises cooling the build material to below a melting point of the build material using the cooler to form a solid plug to prevent the build material from flowing therethrough. The method also includes actuating the valve into an open position to permit the build material to flow into or through the ejector. The valve also includes a heater positioned at least partially around the build material. Actuating the valve into the open position comprises re-heating the build material to above the melting point of the material using the heater to allow the build material to flow therethrough. The method also includes ejecting a drop of the build material through a nozzle of the ejector onto a substrate. The drop cools and solidifies thereon to form a 3D object.

A valve configured to control flow of a material therethrough is also disclosed. The valve includes a body having a bore formed axially therethrough. The valve also includes a cooler positioned at least partially around or within the body. The cooler is configured to cool the material to below a melting point of the material to form a solid plug within the body to prevent the material from flowing therethrough. The valve also includes a heater positioned at least partially around or within the body. The heater is configured to re-heat the material to above the melting point of the material to allow the material to flow therethrough.

In another embodiment, the valve includes a body having a bore formed axially therethrough. The body includes an inlet, an outlet, and a narrow portion therebetween. A diameter of the narrow portion is less than a diameter of the inlet, the outlet, or both. The diameter of the narrow portion is from about 1 mm to about 5 mm. A length of the narrow portion is from about 5 mm to about 25 mm. The valve also includes a cooler positioned at least partially around the narrow portion. The cooler includes a gas or liquid heat exchanger, a thermoelectric cooler, an ambient cooler from convection or radiation, or a combination thereof. The cooler is configured to cool the metal to below a melting point of the metal within about 0.2 seconds or less to form a solid plug within the body to prevent the metal from flowing therethrough. The valve also includes a heater positioned at least partially around the narrow portion and radially between the body and the cooler. The heater includes a resistive or inductive heater. The heater is configured to re-heat the metal to above the melting point of the metal within about 0.2 seconds or less to allow the metal to flow therethrough.

A method for controlling flow of a material is also disclosed. The method includes actuating a valve into a closed position. The valve includes a cooler positioned at least partially around the material. Actuating the valve into the closed position includes cooling the material to below a melting point of the material using the cooler to form a solid plug to prevent the material from flowing therethrough. The method also includes actuating the valve into an open position. The valve also includes a heater positioned at least partially around the material. Actuating the valve into the open position comprises re-heating the material to above the melting point of the material using the heater to allow the material to flow therethrough.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

This present disclosure controls the flow of a material without using conventional valves or microfluidic flow control devices. More particularly, the system and method described herein instead use heaters and/or coolers (e.g., heat sinks) to vary the temperature of the material. The material may transition from a liquid (e.g., molten) state into a solid state and thus not flow when the temperature of the material is cooled to below a predetermined temperature (e.g., the melting point of the material). The material may transition from the solid state (back) into the liquid state and thus flow when the temperature of the material is (re-)heated to above the predetermined temperature. In one embodiment, the material may be a metal (e.g., aluminum) that flows through a nozzle of a 3D printer and is used to build (i.e., print) a 3D object.

Figure 1:
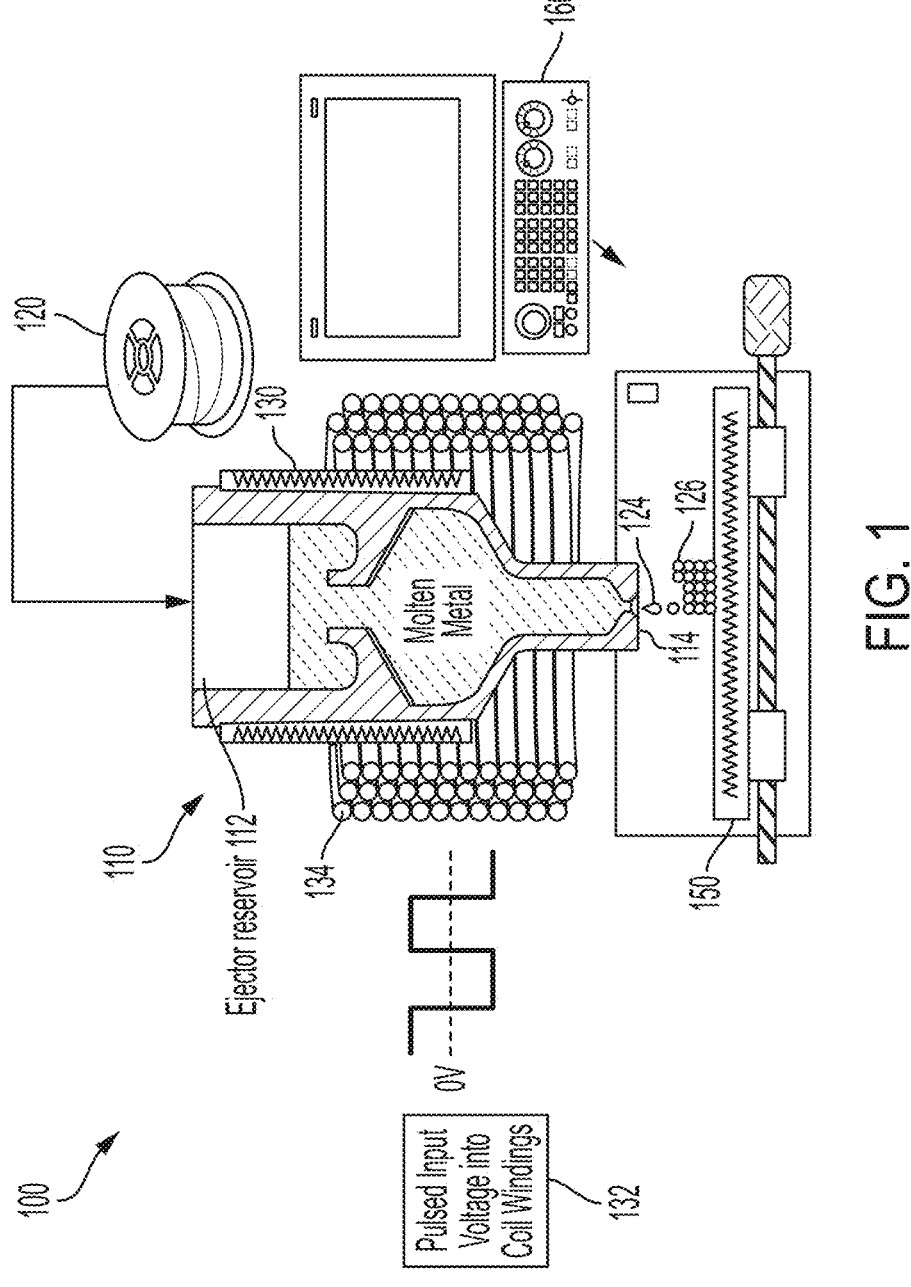
FIG. 1 depicts a schematic cross-sectional side view of a 3D printer, according to an embodiment.

FIG. 1 depicts a schematic cross-sectional side view of a 3D printer 100, according to an embodiment. The printer 100 may include an ejector (also referred to as a pump) 110. As used herein, the ejector 110 refers to a structure that can be selectively activated to cause a build material 120 to be ejected from a nozzle 114. As used herein, the nozzle 114 refers to a physical structure from which the build material 120 begins flight.

The ejector 110 may define a reservoir (also referred to as an ejector reservoir) 112 that is configured to receive and/or store the build material 120 that is to be ejected from the nozzle 114. The build material 120 may be or include a metal, a polymer, or the like. In one embodiment, the build material 120 may be greater than about 50% metal, greater than 60% metal, greater than 70% metal, greater than 80% metal, greater than 90% metal, or about 100% metal (e.g., by volume and/or mass). For example, the build material 120 may be or include a spool of aluminum wire (e.g., 6061 aluminum). In another embodiment, the build material 120 may be or include copper.

The 3D printer 100 may also include one or more heating elements 130. The heating elements 130 are configured to melt the build material 120 within the ejector reservoir 112, thereby converting the build material 120 from the solid state to the liquid (e.g., molten) state within the ejector reservoir 112.

The 3D printer 100 may also include a power source 132 and one or more metallic coils 134. The metallic coils 134 are wrapped at least partially around the ejector 110 and/or the heating elements 130. The power source 132 may be coupled to the coils 134 and configured to provide power thereto. In one embodiment, the power source 132 may be configured to provide a step function direct current (DC) voltage profile (e.g., voltage pulses) to the coils 134, which may create an increasing magnetic field. The increasing magnetic field may cause an electromotive force within the ejector 110, that in turn causes an induced electrical current in the liquid build material 120. The magnetic field and the induced electrical current in the liquid build material 120 may create a radially inward force on the liquid build material 120, known as a Lorentz force. The Lorentz force creates a pressure at an inlet of the nozzle 114 of the ejector 110. The pressure causes the liquid build material 120 to be jetted through and/or ejected from the nozzle 114 in the form of one or more drops (also referred to as droplets) 124.

The 3D printer 100 may also include a substrate (also referred to as a build plate) 150 that is positioned below the nozzle 114. The drops 124 may be jetted through the nozzle 114 and subsequently land on the substrate 150 where they may cool and solidify to form a first (e.g., bottom) layer. Additional drops 124 may be jetted to form layer upon layer that eventually produces a desired 3D object 126.

Figure 2:
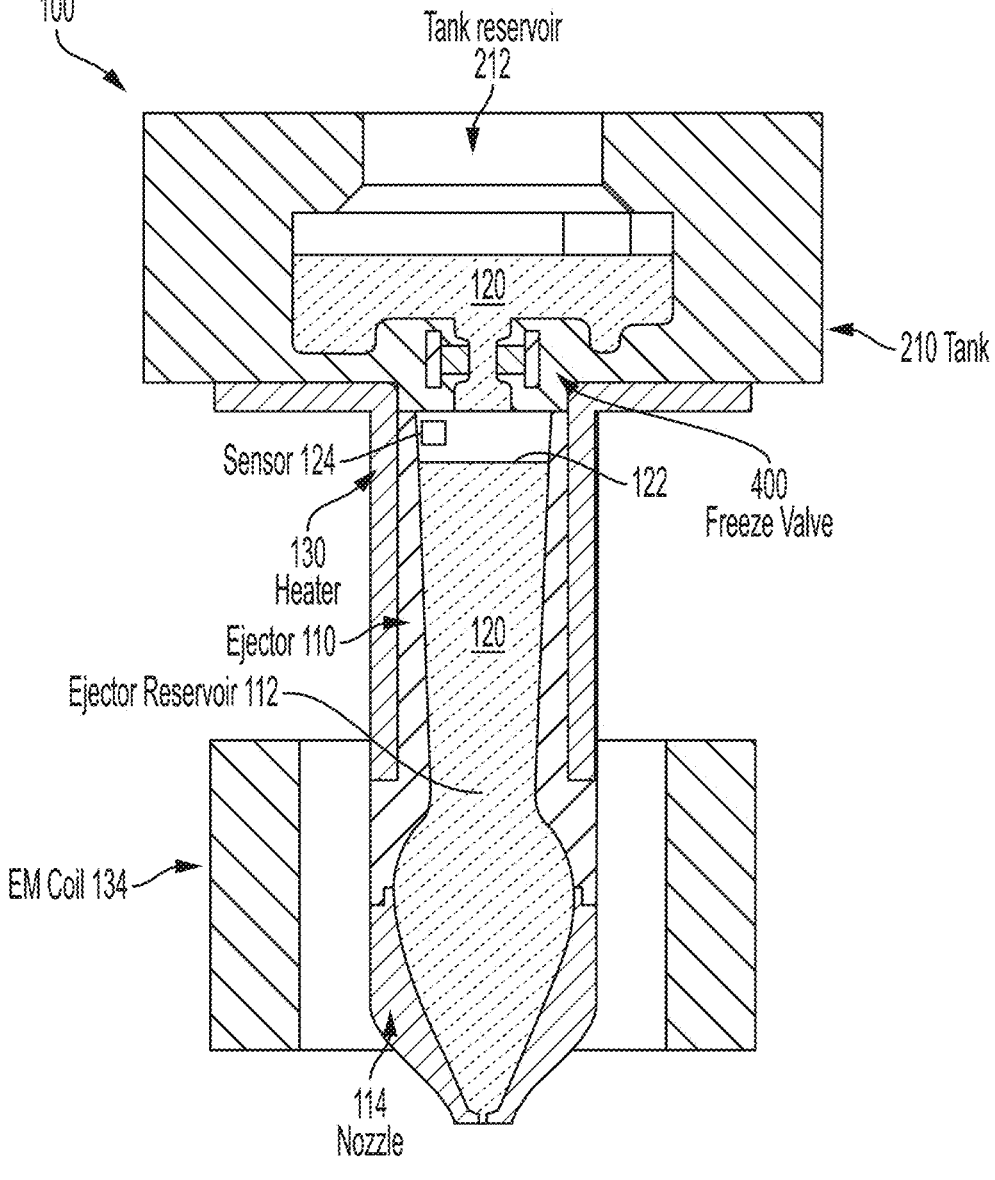
FIG. 2 depicts a schematic cross-sectional side view of a portion of the 3D printer showing a valve positioned at least partially between a first reservoir and a second reservoir, according to an embodiment.

FIG. 2 depicts a schematic cross-sectional side view of a portion of the 3D printer 100 including a valve 400, according to an embodiment. In the embodiment shown, a tank 210 may be coupled to, positioned above, and/or upstream from the ejector 110. The tank 210 may define a first reservoir 212 therein that is configured to receive and/or store the build material 120. Thus, the first reservoir 212 may also or instead be referred to as the tank reservoir, and the second reservoir 112 may be the ejector reservoir.

The valve (also referred to as a flow control device) 400 may be positioned at least partially within the tank 210, the ejector 110, or between the tank 210 and the ejector 110 such that the valve 400 controls the flow of the build material 120 from the tank reservoir 212 into the ejector reservoir 112. More particularly, the valve 400 may be actuated between a first (e.g., open) position and a second (e.g., closed) position to control a level 122 of the build material 120 within the ejector reservoir 112. As shown, a gas (e.g., air) may be present between the valve 400 and the level 122.

In one embodiment, a sensor 224 may be configured to measure the level 122 of the build material 120 in the tank reservoir 212, the ejector reservoir 112, or both. The sensor 224 may be or include a laser level sensor. The valve 400 may be actuated in response to the measurements from the sensor 224. For example, the valve 400 may actuate into the open position to allow the build material 120 to flow from the tank reservoir 212 into the ejector reservoir 112 in response to the level 122 being less than a first (e.g., lower) level threshold. The valve 400 may also actuate into the closed position to prevent the build material 120 from flowing from the tank reservoir 212 into the ejector reservoir 112 in response to the level 122 being greater than or equal to a second (e.g., upper) level threshold. In one embodiment the first and second level thresholds may instead be a single level threshold.

Controlling the level 122 (e.g., maintaining the level 122 between the thresholds) may improve reliability of the actuation of the ejector 110 (e.g., the ejection of the drops 124). Maintaining the level 122 may help to maintain a consistent volume of the build material 120 in the ejector 110. The volume of build material 120 in the ejector 100 may (e.g., directly) affect how the electromagnetics of the coils 134 interact with the build material 120. More particularly, if the level 122 is maintained between the first and second thresholds, this may improve the reliability (e.g., size, shape, consistency, etc.) of the drops 124 ejected through the nozzle 114.

Figure 3:
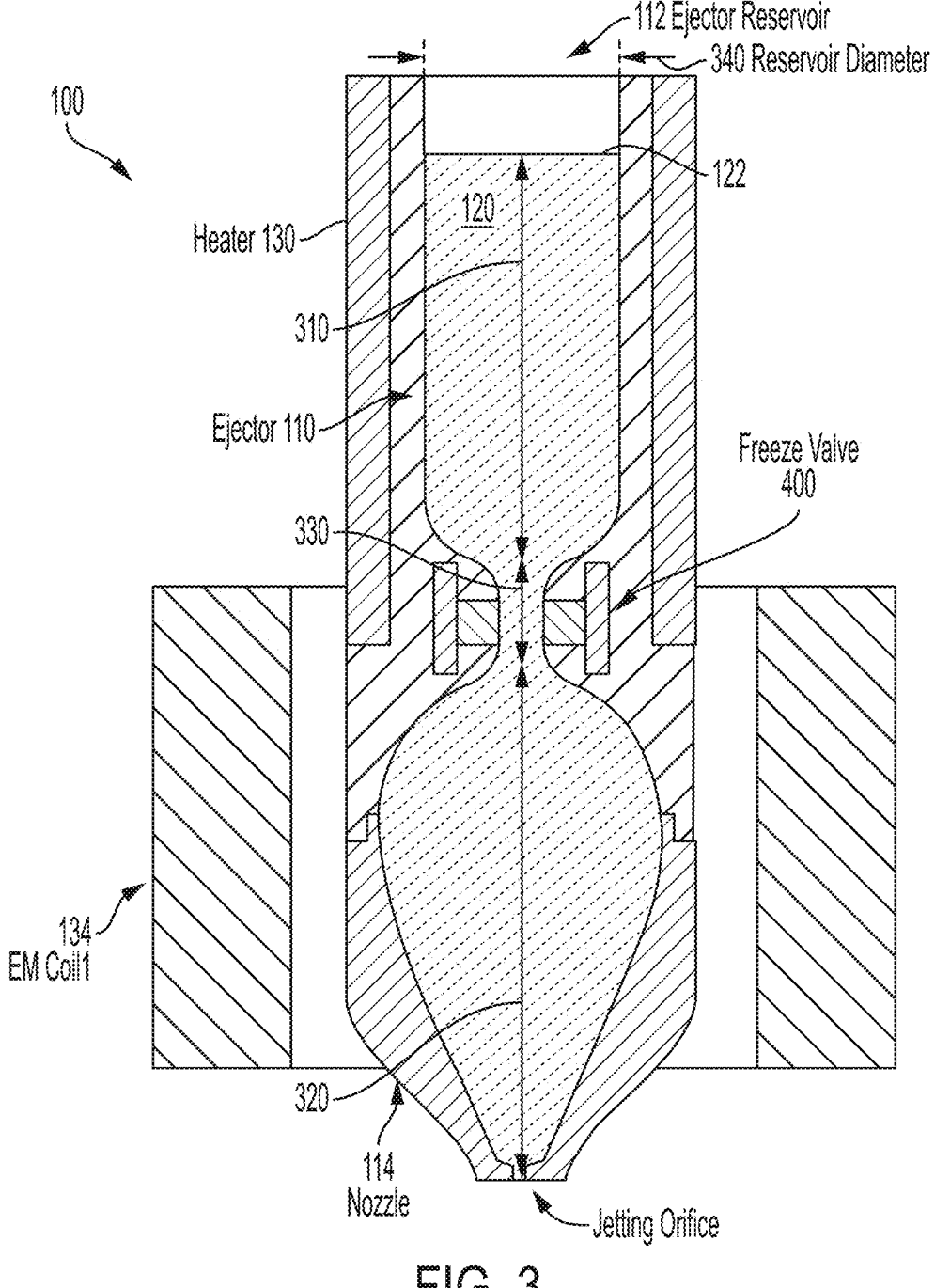
FIG. 3 depicts a schematic cross-sectional side view of a portion of the 3D printer showing the valve positioned at least partially within the second reservoir, according to an embodiment.

FIG. 3 depicts a schematic cross-sectional side view of a portion of the 3D printer 100 showing the valve 400 positioned at least partially within the ejector 110, according to an embodiment. The ejector reservoir 112 may include a first (e.g., upper) portion 310, a second (e.g., lower) portion 320, and a third (e.g., intermediate) portion 330 therebetween. The ejector reservoir 112 may have a smaller width (e.g., diameter) 340 in the intermediate portion 330 than in the upper and/or lower portions 310, 320. For example, the ejector reservoir 112 may be substantially hourglass-shaped.

The valve 400 may positioned at least partially within the ejector 110 and at least partially around the intermediate portion 330 of the ejector reservoir 112. In one embodiment, the valve 400 may be positioned below the level 122 of the build material 120 in the ejector reservoir 112. The valve 400 may be actuated between the first (e.g., open) position and the second (e.g., closed) position to control forces within the ejector reservoir 112. For example, each time that a pulse causes a drop 124 to be ejected from the nozzle 114, forces are generated within the lower portion 320 of the ejector reservoir 112. More particularly, a portion of the force is directed downward and facilitates the ejection of the drop 124. However, another portion of the force is directed upward and is essentially wasted force.

In one embodiment, the valve 400 may begin to actuate into the closed position simultaneously with the pulse (and/or the ejection of the drop 124). In another embodiment, the valve 400 may begin to actuate into the closed position within a first predetermined amount of time before the pulse or after the pulse. The first predetermined amount of time may be from about 0.0001 seconds to about 0.001 seconds, about 0.001 seconds to about 0.01 seconds, or about 0.01 seconds to about 0.1 seconds. The valve 400 may automatically begin to actuate back into the open position a second predetermined amount of time after the valve 400 has actuated into the closed position. The second predetermined amount of time may be from about 0.00025 seconds to about 0.001 seconds, about 0.001 seconds to about 0.01 seconds, or from about 0.01 seconds to about 0.1 seconds. The duration of the actuation may be from about 0.0001 seconds to about 0.001 seconds, about 0.001 seconds to about 0.01 seconds, about 0.01 seconds to about 0.1 seconds, or about 0.1 seconds to about 0.5 seconds. Actuating the valve 400 in this manner may redirect at least a portion of the upward force in the downward direction. As a result, the force with which the drop 124 is ejected may be increased. Alternatively, the strength (e.g., voltage or current) of the pulse may be decreased, which may save energy.

Figure 4:
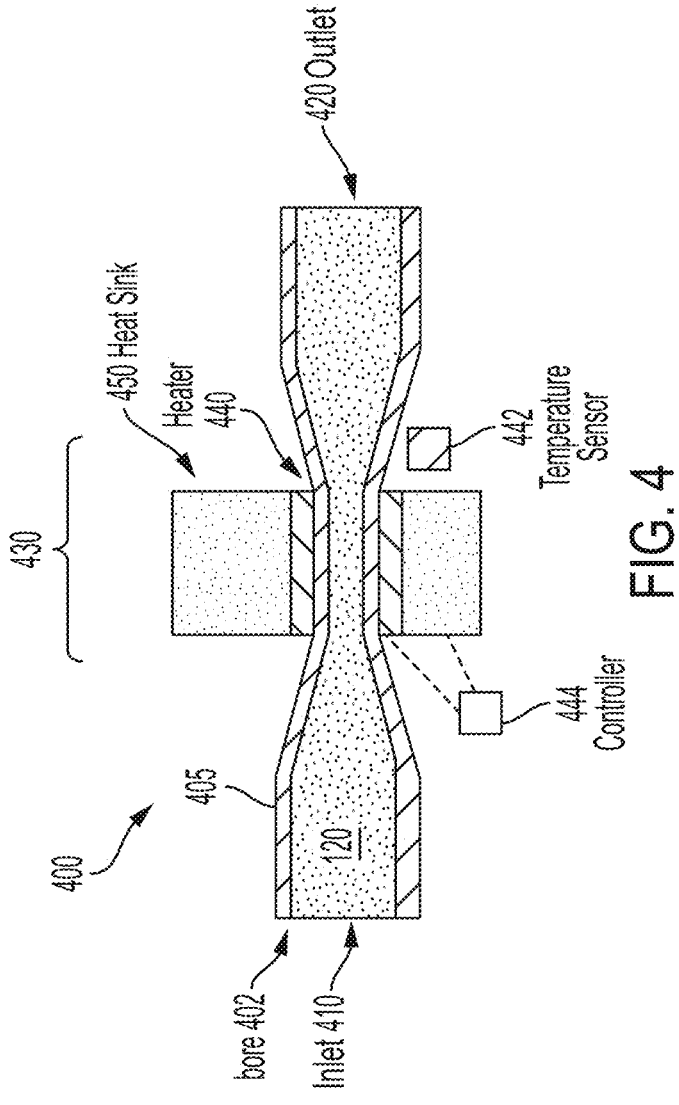
FIG. 4 depicts a schematic cross-sectional side view of the valve in FIGS. 2 and/or 3, according to an embodiment.

FIG. 4 depicts a schematic cross-sectional side view of the valve 400, according to an embodiment. The valve 400 may include a body 405. In one embodiment, the body 405 may be a part of the tank 210. In another embodiment, the body 405 may be a part of the ejector 110. In yet another embodiment, the body 405 may be a separate physical part/component that is coupled to and/or positioned at least partially within the tank 210, the ejector 110, or therebetween.

The body 405 may include or define an inlet 410 and an outlet 420. In the embodiment of FIG. 2, the inlet 410 may be connected to and/or in fluid communication with the tank reservoir 212, and the outlet 420 may be connected to and/or in fluid communication with the ejector reservoir 112. In the embodiment of FIG. 3, the inlet 410 may be connected to and/or in fluid communication with the upper portion 310 of the ejector reservoir 112, and the outlet 420 may be connected to and/or in fluid communication with the lower portion 320 of the ejector reservoir 112. The body 405 may define an axial bore (also referred to as a channel) 402 that extends therethrough from the inlet 410 to the outlet 420.

The body 405 may also include an intermediate (e.g., narrow) portion 430 between the inlet 410 and the outlet 420. The narrow portion 430 may have a smaller width (e.g., diameter) than the inlet 410 and/or the outlet 420. For example, the diameter of the narrow portion 430 may be from about 0.1 mm to about 1 mm, about 1 mm to about 5 mm, or about 5 mm to about 10 mm. A length of the narrow portion 430 may be from about 1 mm to about 5 mm, about 5 mm to about 10 mm, about 10 mm to about 20 mm, or about 20 mm to about 50 mm. The narrow portion 430 may serve to reduce the amount (e.g., mass, volume, and/or flow rate) of build material 120 therein and/or flowing therethrough, which may facilitate varying the temperature of the build material 120 therein, as described below. The narrow portion 430 may also serve to decrease actuation times, reduce total actuation energy, and/or eliminate over/undershooting of the valve 400 during actuation between the open and closed positions.

The valve 400 may also include a heater 440. The heater 440 may be or include a resistive and/or inductive heating element positioned at least partially around the body 405. As shown, the heater 440 may be positioned at least partially around the narrow portion 430 of the body 405. The heater 440 may be configured to increase the temperature of the build material 120 above the melting point of the build material 120 so that the now-liquid build material 120 may flow through the nozzle 114.

When the heater 440 is on, and the build material 120 is melted, the body 405 and/or the bore 402 defined therein may have a lower resistance to flow than conventional valves and microfluidic valve designs whose flow paths create some resistance. This may be because no valve geometry exists inside the flow path which would add fluid drag and higher flow resistance. In other words, the inner surface of the body 405 may be smooth. In one embodiment, the heater 440 may provide throttleable (e.g., controllable) flow control by only partially solidifying (e.g., freezing) the build material 120 and/or by increasing the viscosity of the build material 120 near its melting point.

The heater 440 can be operated open loop (e.g., with or without measurement and feedback) if the thermal behavior within the 3D printer 100 is predictable and/or the bore 402 approaches a known temperature with the heater 440 on, off, or at partial power. The heater 440 can also or instead be operated closed loop where a temperature measurement device 442 (e.g., a thermocouple located near the bore 402) provides feedback to a controller 244 (e.g., part of computing system 160 in FIG. 1) which controls the heater 440 (and/or cooler 450) to bring the build material 120 in the bore 402 to a target temperature.

The valve 400 may also include a cooler (e.g., a heat sink) 450. The cooler 450 may be or include a gas or liquid heat exchanger, a thermoelectric cooler, and/or an ambient cooler from convection or radiation positioned at least partially around the body 405. As shown, the cooler 450 may be positioned at least partially around the narrow portion 430 of the body 405. In one embodiment, the cooler 450 may be positioned at least partially around (e.g., radially-outward from) the heater 440. Having the cooler 450 positioned around the heater 440 may allow faster valve actuation by reducing thermal inertia. In another embodiment, the heater 440 may be positioned around a portion of the circumference of the body 405 (e.g., the narrow portion 430), and the cooler 450 may be positioned around a different portion of the circumference of the body 405 (e.g., the narrow portion 430). In yet another embodiment, the heater 440 and the cooler 450 may be axially-offset from one another. In other words, the heater 440 may be positioned upstream and/or downstream from the cooler 450.

The cooler 450 may be configured to decrease the temperature of the build material 120 below the melting point of the build material 120 to at least partially solidify (e.g., freeze) the build material 120, which may form a plug (e.g., made of the solidified build material 120) that prevents the build material 120 from flowing through the valve 400 and/or nozzle 114. When the heater 440 is off and the build material 120 is solidified, the build material 120 may adhere to the inner walls of the valve 400 and/or mechanically lodge in features such as ridges or the tapered portion (e.g., shoulder) in the body 405 caused by the reducing diameter, which may prevent the solid plug from moving downstream even under pressure. In one embodiment, even when the cooler 450 cools the build material 120 to below the melting point, a remainder of the 3D printer 100 around the valve 400 may remain above the melting point.

In one embodiment, the valve 400 may be in a normally-closed position that solidifies the build material 120. For example, the valve 400 may be in the closed position when the heater 440 is off, and the valve 400 may actuate into the open position to liquify the build material 120 when the heater 440 is turned on. In another embodiment, the valve 400 may be in a normally-open position. For example, the cooler 450 may be turned on, instead of the heater 440, by electrical or mechanical switching. In one embodiment, the flow may be completely stopped when the valve 400 is in the closed position, and the build material 120 may flow freely when the valve 400 is in the open position. Minimal overshooting can be observed during opening due to the transient remelting of the molten metal.

Figure 5:
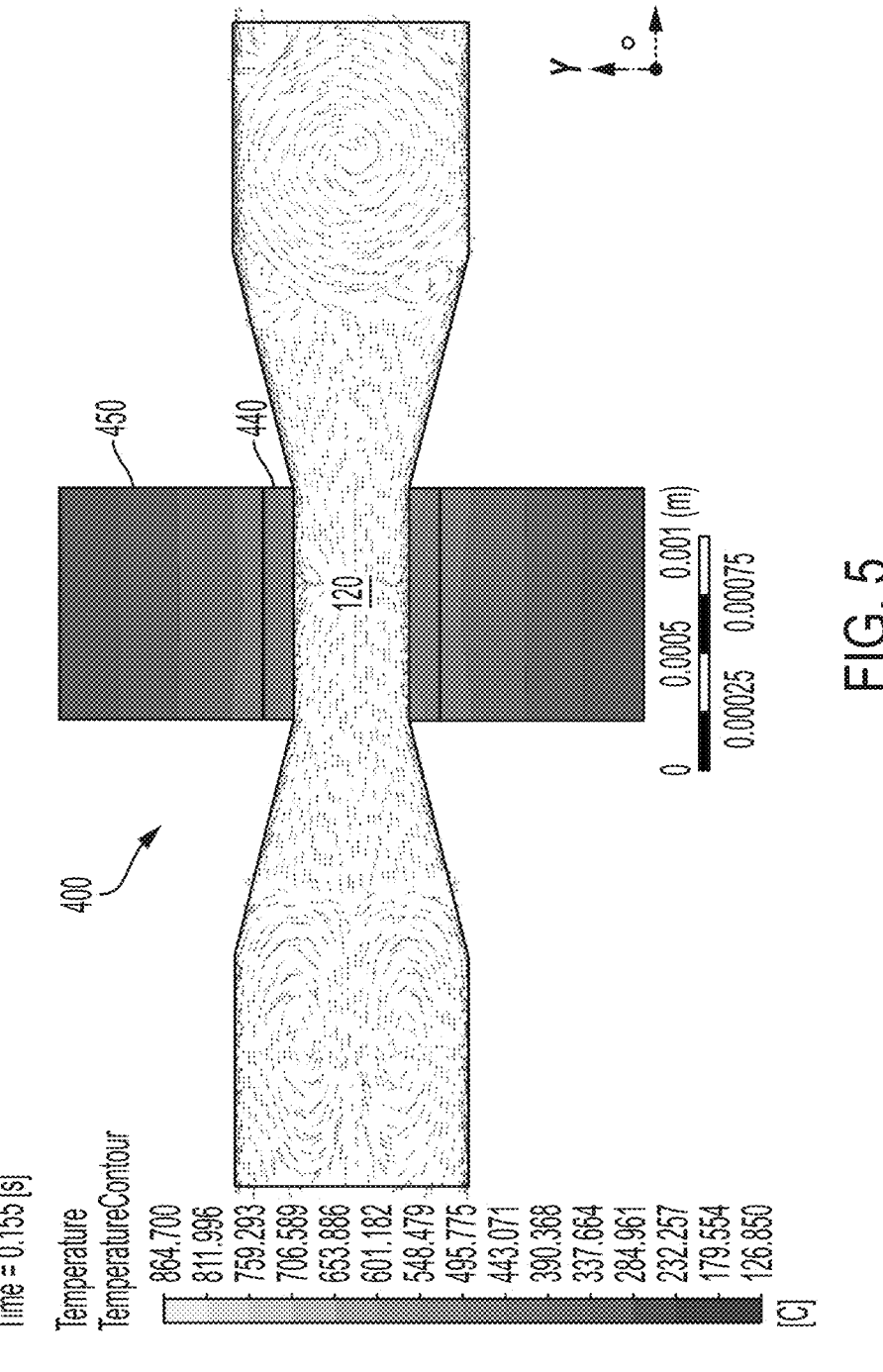
FIG. 5 depicts a schematic cross-sectional side view of the valve in a closed position, according to an embodiment.

FIG. 5 depicts a schematic cross-sectional side view of the valve 400 in the closed position, according to an embodiment. More particularly, FIG. 5 depicts a temperature contour of the build material 120 and the valve 400 when the valve 400 is in the closed position. To actuate the valve 400 into the closed position, the cooler 450 may be turned on, and/or the heater 440 may be turned off. This may cause the cooler 450 to reduce the temperature of the heater 440 and/or the build material 120 within the valve 400. As shown, the temperature of the cooler 450 may be from about 120° C. to about 600° C. The temperature of the heater 440 may be higher than the temperature of the cooler 450. For example, the temperature of the heater 440 may be from about 650° C. to about 1000° C. The temperature of the build material 120 within or downstream from the valve 400 may be from about 650° C. to about 1000° C.

Figure 6:
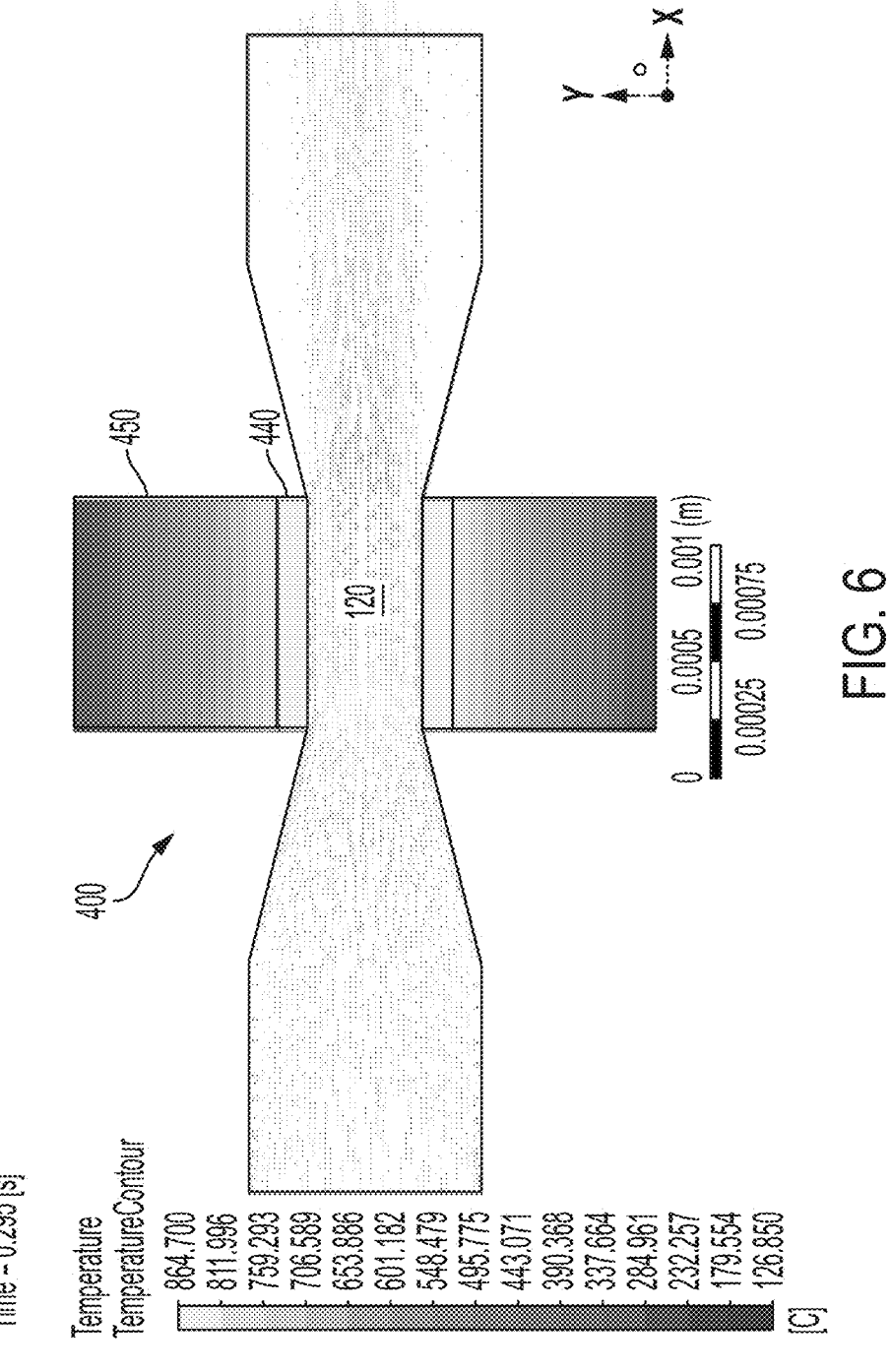
FIG. 6 depicts a schematic cross-sectional side view of the valve in an open position, according to an embodiment.

FIG. 6 depicts a schematic cross-sectional side view of the valve 400 in the open position, according to an embodiment. More particularly, FIG. 6 depicts a temperature contour of the build material 120 and the valve 400 when the valve 400 is in the open position. To actuate the valve 400 into the open position, the heater 440 may be turned on, and/or cooler 450 may be turned off. This may cause the heater 440 to increase the temperature of the build material 120 within the valve 400. As shown, the temperature of the heater 440 may be from about 600° C. to about 1000° C. The temperature of the build material 120 within or downstream from the valve 400 may be from about 600° C. to about 1000° C. The temperature of the cooler 450 may be from about 150° C. to about 600° C.

Figure 7:
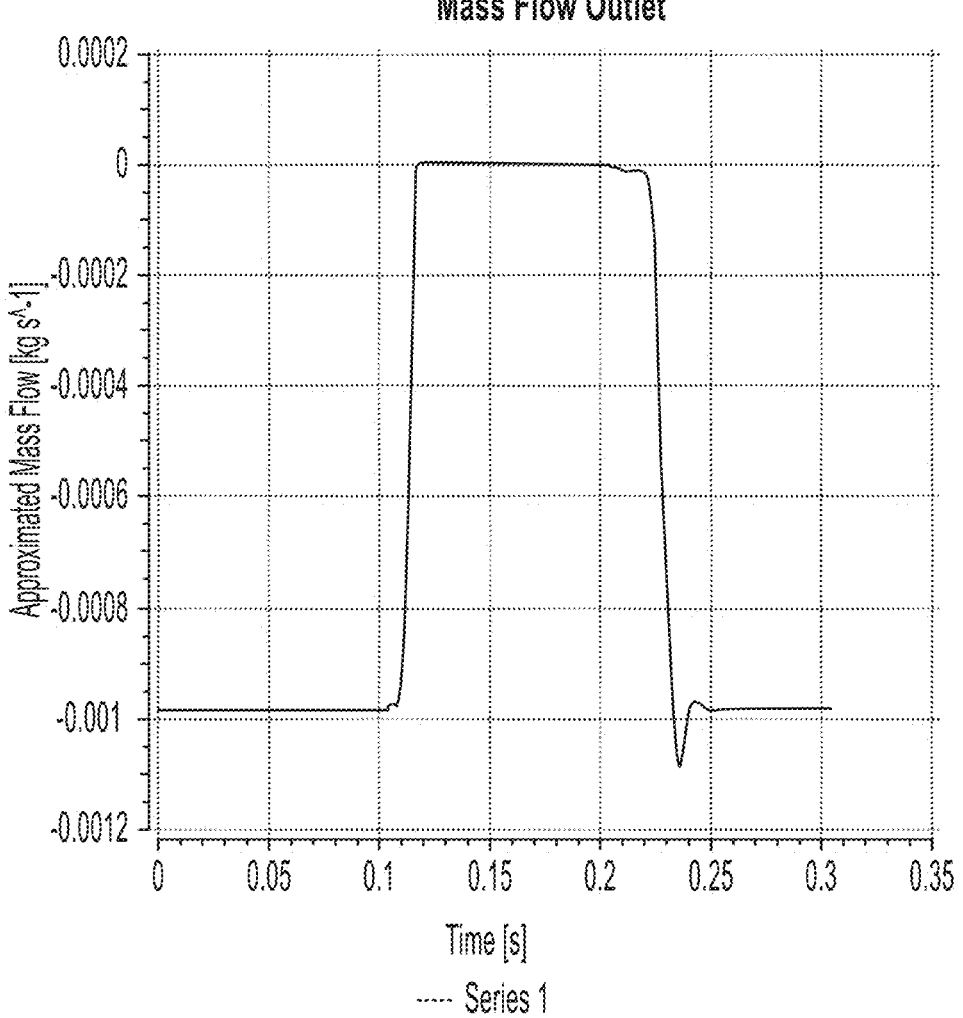
FIG. 7 depicts a graph showing mass flow through the 3D printer (e.g., the valve), according to an embodiment.

FIG. 7 depicts a graph showing mass flow through the 3D printer 100 (e.g., the valve) 400, according to an embodiment. More particularly, FIG. 7 depicts a single open and close cycle of the valve 400. The valve 400 is closed from 0.1 s to 0.25 s. The actuation times can be calculated within approximately 0.02 s on both the close and open signals. A slight overshooting in the mass flow is observed during remelting due to the uneven remelting of the solidified fluid plug.

Figure 8:
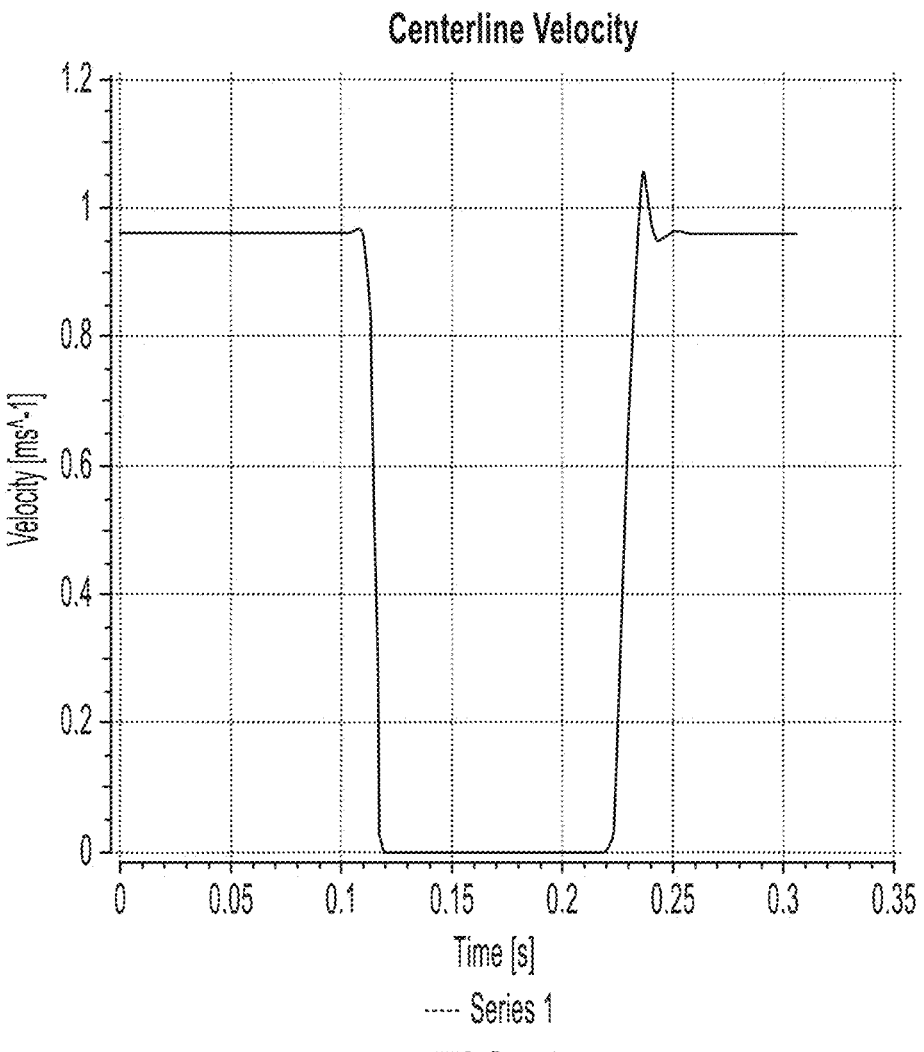
FIG. 8 depicts a graph showing a centerline velocity through the 3D printer (e.g., the valve), according to an embodiment.

FIG. 8 depicts a graph showing a centerline velocity through the 3D printer 100 (e.g., the valve 400), according to an embodiment. More particularly, FIG. 8 shows the same data as FIG. 7; however, FIG. 8 is transformed from mass flow to velocity.

Figure 9:
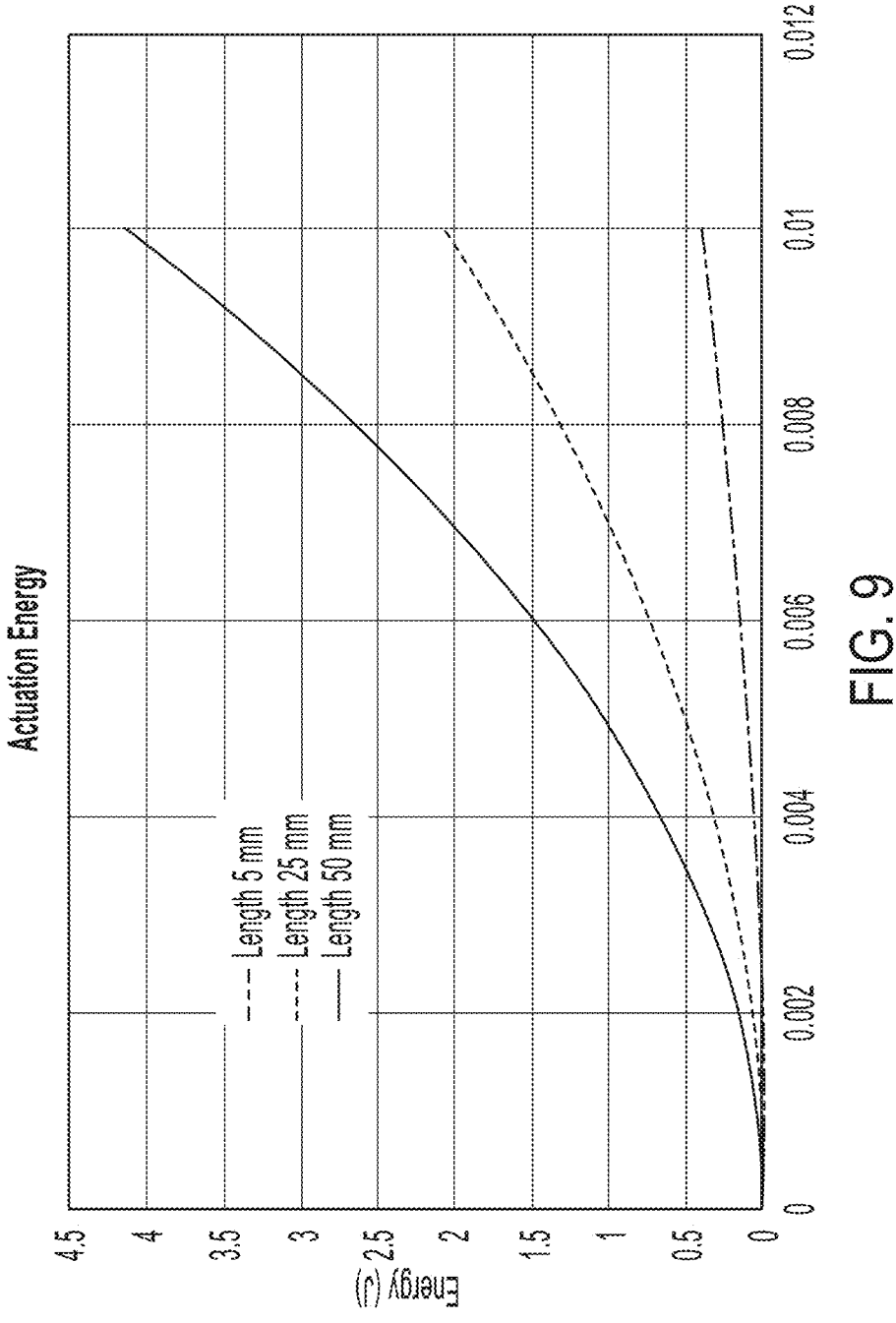
FIG. 9 depicts a graph showing the energy to actuate the valve versus the size (e.g., diameter and/or length) of the valve, according to an embodiment.

FIG. 9 depicts a graph showing the energy to actuate the valve 400 versus the size of the valve 400, according to an embodiment. Three curves are shown in FIG. 9. The lower curve represents a valve 400 where the valve 400 (e.g., the narrow portion 430) is 5 mm long. The middle curve represents a valve 400 where the valve 400 (e.g., the narrow portion 430) is 25 mm long. The upper curve represents a valve 400 where the valve 400 (e.g., the narrow portion 430) is 50 mm long. The X-axis represents the diameter of the valve 400 (e.g., the narrow portion 430) in meters, and the Y-axis represents the energy to actuate the valve 400 (in Joules) from the open position into the closed position and/or from the closed position into the open position. In an example, the energy to actuate the valve 400 may be from about 0.004 Joules (e.g., for valve where the narrow portion is 5 mm in length and 1 mm in diameter) to about 4 Joules (e.g., for the valve where the narrow portion is 50 mm in length and 10 mm in diameter).

Figure 10:
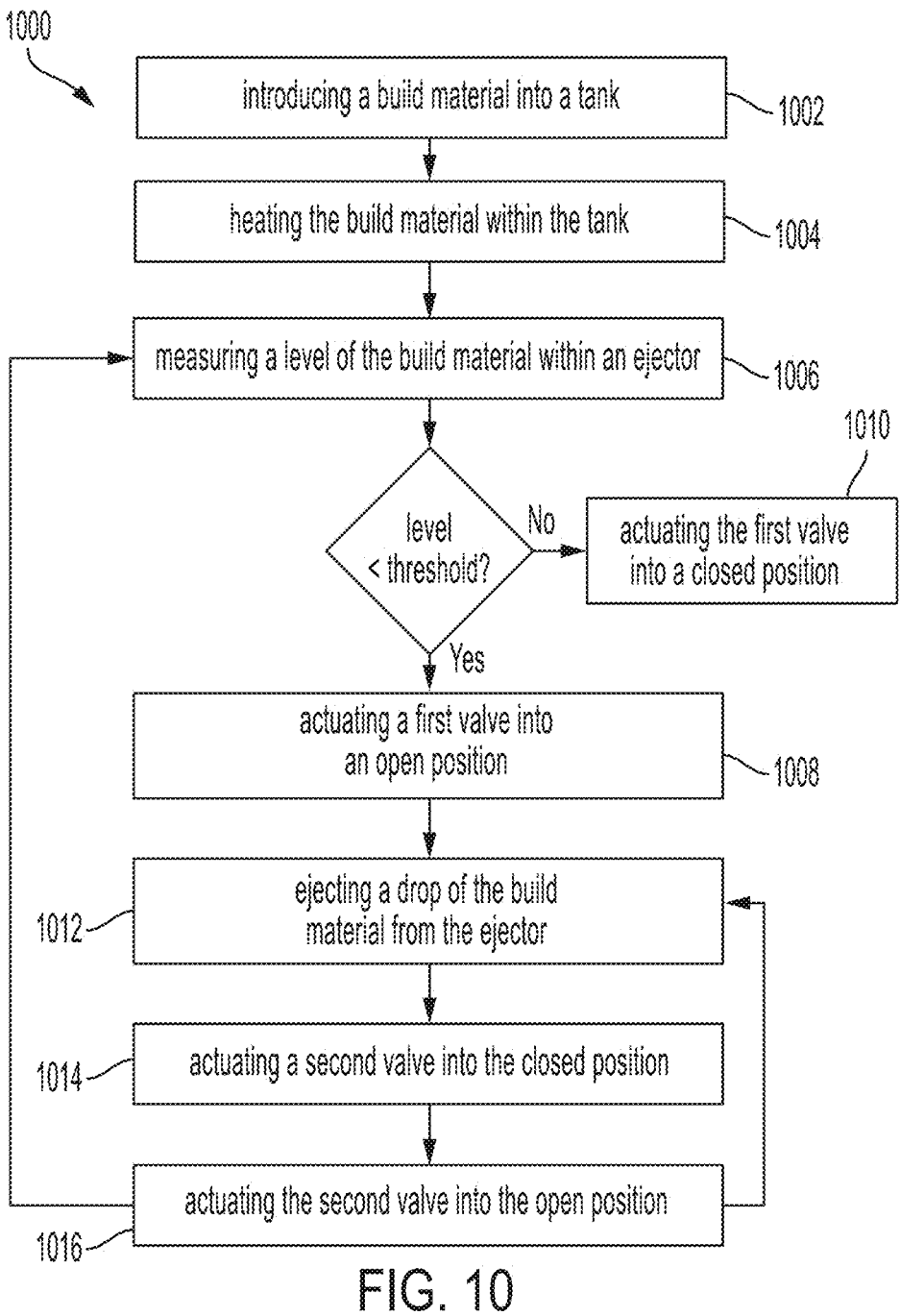
FIG. 10 depicts a flowchart of a method for controlling flow through the 3D printer, according to an embodiment.

FIG. 10 depicts a flowchart of a method 1000 for controlling flow through the 3D printer 100, according to an embodiment. More particularly, the method 1000 may control the flow of the build material 120 through the valve 400 and/or nozzle 114. An illustrative order of the method 700 is provided below. However, one or more steps of the method 700 may be performed in a different order, combined, repeated, or omitted.

The method 1000 may include introducing the build material 120 into the tank 210, as at 1002. In one embodiment, the build material 120 may be in the solid state when introduced into the tank reservoir 212 of the tank 210.

The method 1000 may also include heating the build material 120 within the tank 210, as at 1004. The build material 120 may be heated using the heating elements 130 to convert the build material 120 from the solid state into the liquid (e.g., molten) state within the tank reservoir 212. As shown in FIG. 2, the heating elements 130 may be positioned below and/or in contact with the lower surface of the tank 210 and thus able to provide heat to the tank 210. In another embodiment, the tank 210 may be omitted, and the build material 120 may be introduced directly into the ejector 110 and/or heated within the ejector 110.

The method 1000 may also include measuring the level 122 of the build material 120 within the ejector 110, as at 1006. The level 122 may be measured using the sensor 224. In one embodiment, the level 122 may be measured at predetermined intervals (e.g., once per second). In another embodiment, the level 122 may be measured after a predetermined number of pulses and/or drop ejections (e.g., after 10 pulses and/or drops).

In response to the level 122 being less than the lower level threshold, the method 1000 may also include actuating a first valve 400 into the open position, as at 1008. In the event that the first valve 400 is already in the open position, this step may include maintaining the first valve 400 in the open position. The first valve 400 may be or include the valve 400 shown in FIG. 2, which controls the flow of the build material 120 from the tank reservoir 212 into the ejector reservoir 112. Thus, maintaining or actuating the first valve 400 in the open position may allow the build material 120 to flow from the tank reservoir 212, through the first valve 400, into the ejector reservoir 112.

Actuating the first valve 400 in the open position may include increasing the temperature of the build material 120 within the first valve 400 to above the melting point so that the build material 120 liquifies (or remains in the liquid state if already in the liquid state). Thus, if the first valve 400 was previously in the closed position, actuating the first valve 400 into the open position may melt the solidified plug of the build material 120 therein. As a result, the build material 120 may flow through the first valve 400. Actuating the first valve 400 into the open position may include turning the heater 440 on and heating the build material 120 in the first valve 400. In one embodiment, the cooler 450 may be turned off so as to not cool the build material 120 in the first valve 400. In another embodiment, the cooler 450 may be a passive device and not configured to be turned on and/or off.

In response to the level 122 being greater than or equal to the upper level threshold, the method 1000 may also include actuating the first valve 400 into the closed position, as at 1010. Actuating the first valve 400 into the closed position may prevent additional build material 120 from flowing from the tank reservoir 212 into the ejector reservoir 112.

Actuating the first valve 400 into the closed position may include reducing the temperature of the build material 120 to below the melting point so that the build material 120 at least partially solidifies (and forms the plug) within the first valve 400. Actuating the first valve 400 into the closed position may include turning the heater 440 off so that it no longer provides heat to the build material 120. This may also or instead include turning the cooler 450 on so that it cools the build material 120. As mentioned above, the cooler 450 may instead be a passive device that provides cooling without being turned on and/or off.

The method 1000 may also include ejecting a drop 124 of the build material 120 from the ejector 110, as at 1012. More particularly, a pulse from the coils 134 may cause a drop 124 of the build material 120 to be ejected through the nozzle 114 of the ejector 110. The drop 124 may fall and land on the substrate 150 to form at least a portion of the 3D object 126.

The method 1000 may also include actuating a second valve 400 into the closed position, as at 1014. The second valve 400 may be or include the valve 400 shown in FIG. 3, which is positioned at least partially between the upper and lower portions 310, 320 of the ejector reservoir 112 in the ejector 110. As mentioned above, in one embodiment, the second valve 400 may be actuated into the closed position simultaneously with the pulse (and/or drop ejection). In another embodiment, the second valve 400 may be actuated into the closed position within the first predetermined amount of time before the pulse (and/or drop ejection) or after the pulse (and/or drop ejection).

Actuating the second valve 400 into the closed position may include reducing the temperature of the build material 120 to below the melting point so that the build material 120 at least partially solidifies (and forms the plug) within the second valve 400. Actuating the second valve 400 into the closed position may include turning the heater 440 off so that it no longer provides heat to the build material 120. This may also or instead include turning the cooler 450 on so that it cools the build material 120. As mentioned above, the cooler 450 may instead be a passive device that provides cooling without being turned on and/or off.

The method 1000 may also include actuating the second valve 400 into the open position, as at 1016. The second valve 400 may actuate back into the open position the second predetermined amount of time after the pulse, the drop ejection, and/or the closing of the second valve 400.

Actuating the second valve 400 back into the open position may include increasing the temperature of the build material 120 to above the melting point so that the build material 120 (re-) liquifies within the second valve 400. Thus, actuating the second valve 400 into the open position melts the solidified plug of the build material 120 therein. As a result, the build material 120 may once again flow through the second valve 400. Actuating the second valve 400 into the open position may include turning the heater 440 on and heating the build material 120 in the second valve 400. In one embodiment, the cooler 450 may be turned off so as to not cool the build material 120 in the second valve 400. In another embodiment, the cooler 450 may be a passive device and not configured to be turned on and/or off.

The method 1000 may then loop back around to step 1006 for measuring the level 122 and/or step 1012 for the ejection of another drop 124 to continue building the 3D object 126 on the substrate 150.

The method 1000 may also include actuating a plurality of valves 400. In one embodiment, a single 3D printer 100 may include a plurality of (e.g., parallel) valves 400 and/or nozzles 114. In another embodiment, there may be a plurality of 3D printers, with each including one or more valves 400 and/or nozzles 114. The 3D printer(s) 100 may receive simultaneously driving pulses. The valves 400 may be selectively actuated to eject the build material 120 (e.g., drops 124) through only a subset of the nozzles 114 at a time. For example, a first subset of the valves 400 may be actuated into the open position, which may allow the build material 120 to flow therethrough (e.g., and be ejected out of the first subset of the nozzles 114). However, a second subset of the valves 400 may be in the closed position, which may prevent the build material 120 from flowing therethrough. As a result, the build material 120 may not be ejected out of the second subset of the nozzles 114.

As the valve 400 may include only a heater 440 and/or cooler 450, it can be made on a small size scale and placed along an array of nozzles easily. The drop generation frequency (i.e., firing rate) may depend upon the freeze and/or thaw times. Many driving pulse technologies may benefit from this valve 400 (e.g., from pneumatic to magnetohydrodynamic) because a single actuator may drive an entire array or sub-array of nozzles 114. The valve 400 may also or instead be used in single- or multi-nozzle extrusion printers to turn the nozzle 114 on and off if the driving pressure is difficult to control quickly.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A 3D printer, comprising:
a tank defining a tank reservoir that is configured to receive a material; an ejector positioned below the tank, wherein the ejector comprises:
an ejector body defining an ejector reservoir that is configured to receive the material;
an ejector heater positioned at least partially around the ejector body, wherein the heater is configured to heat the material within the ejector body; and
a coil wrapped at least partially around the ejector body, wherein the coil is configured to cause droplets of the heated material to be ejected from a nozzle of the ejector body; and
a valve configured to control flow of the material therethrough from the tank reservoir into the ejector reservoir, the valve comprising:
a valve body having a bore formed axially therethrough;
a valve cooler positioned at least partially around or within the valve body, wherein the valve cooler is configured to cool the material to below a melting point of the material to form a solid plug within the valve body to prevent the material from flowing from the tank reservoir into the ejector reservoir, and
a valve heater positioned at least partially around or within the valve body, wherein the valve heater is configured to re-heat the material to above the melting point of the material to allow the material to flow from the tank reservoir into the ejector reservoir; and
wherein the valve body comprises an inlet, an outlet, and a narrow portion therebetween, and wherein a diameter of the narrow portion is less than a diameter of the inlet and the outlet.

2. The 3D printer of claim 1, wherein the material comprises metal.

3. The 3D printer of claim 1, wherein the diameter of the narrow portion is from about 1 mm to about 10 mm, and wherein a length of the narrow portion is from about 5 mm to about 50 mm.

4. The 3D printer of claim 1, wherein the valve cooler, the valve heater, or both are positioned at least partially around the narrow portion and not around the inlet and the outlet.

5. The 3D printer of claim 1, wherein the valve cooler comprises a gas or liquid heat exchanger, a thermoelectric cooler, an ambient cooler from convection or radiation, or a combination thereof, and wherein the valve heater comprises a resistive or inductive heater.

6. The 3D printer of claim 1, wherein the valve heater is positioned radially between and in contact with the valve body and the valve cooler.

7. The 3D printer of claim 1, wherein the valve cooler is positioned around a first portion of a circumference of the valve body, and wherein the valve heater is positioned around a second, different portion of the circumference of the valve body.

8. The 3D printer of claim 1, wherein the valve cooler and the valve heater are axially-offset from one another along the valve body.

9. The 3D printer of claim 1, further comprising:

a level sensor configured to measure a level of the material; and a controller configured to control the valve heater, the valve cooler, or both based at least partially in response to the measured level.

10. The 3D printer of claim 1, further comprising:

a temperature sensor configured to measure a temperature of the material within the valve body; and a controller configured to control the valve heater, the valve cooler, or both based at least partially in response to the measured temperature.

11. The 3D printer of claim 1, wherein an energy used by the valve cooler to cool the material to below the melting point, or used by the valve heater to re-heat the material to above the melting point, is from about 0.004 Joules to about 5 Joules.

12. The 3D printer of claim 1, wherein the valve cooler is configured to cool the material to below the melting point within 0.2 seconds, and wherein the valve heater is configured to re-heat the material to above the melting point within 0.2 seconds.

13. The 3D printer of claim 1, wherein the valve cooler is configured to begin to cool the material to below the melting point simultaneously with a pulse or within a first predetermined amount of time before or after the pulse, wherein the first predetermined amount of time is from about 0.0001 seconds to about 0.01 seconds, wherein the valve heater is configured to begin to re-heat the material to above the melting point a second predetermined amount of time after the material forms the solid plug, and wherein the second predetermined amount of time is from about 0.00025 seconds to about 0.001 seconds.

14. A 3D printer, comprising:

a tank defining a tank reservoir that is configured to receive a metal;

an ejector positioned below the tank, wherein the ejector comprises:

an ejector body defining an ejector reservoir that is configured to receive the metal;

an ejector heater positioned at least partially around the ejector body, wherein the heater is configured to heat the metal within the ejector body; and a coil wrapped at least partially around the ejector body, wherein the coil is configured to cause droplets of the heated metal to be ejected from a nozzle of the ejector body; and a valve configured to control flow of the metal from the tank reservoir into the ejector reservoir, the valve comprising:

a valve body having a bore formed axially therethrough, wherein the valve body comprises an inlet, an outlet, and a narrow portion therebetween, wherein a diameter of the narrow portion is less than a diameter of the inlet, the outlet, or both, wherein the diameter of the narrow portion is from about 1 mm to about 5 mm, and wherein a length of the narrow portion is from about 5 mm to about 25 mm;

a valve cooler positioned at least partially around the narrow portion, wherein the valve cooler comprises a gas or liquid heat exchanger, a thermoelectric cooler, an ambient cooler from convection or radiation, or a combination thereof, wherein the valve cooler is configured to cool the metal to below a melting point of the metal within about 0.2 seconds or less to form a solid plug within the valve body to prevent the metal from flowing from the tank reservoir into the ejector reservoir; and a valve heater positioned at least partially around the narrow portion and radially between the valve body and the valve cooler, wherein the valve heater comprises a resistive or inductive heater, and wherein the valve heater is configured to re-heat the metal to above the melting point of the metal within about 0.2 seconds or less to allow the metal to flow from the tank reservoir into the ejector reservoir.

\* \* \* \* \*